W. E. ROBERTS.
APPARATUS FOR MAKING HOLLOW RUBBER ARTICLES.
APPLICATION FILED DEC 29, 1919.

1,387,617.

Patented Aug. 16, 1921.
3 SHEETS—SHEET 1.

Inventor
Wm. E. Roberts,
By Baker & Macklin,
Attys.

W. E. ROBERTS.
APPARATUS FOR MAKING HOLLOW RUBBER ARTICLES.
APPLICATION FILED DEC 29, 1919.
1,387,617. Patented Aug. 16, 1921.
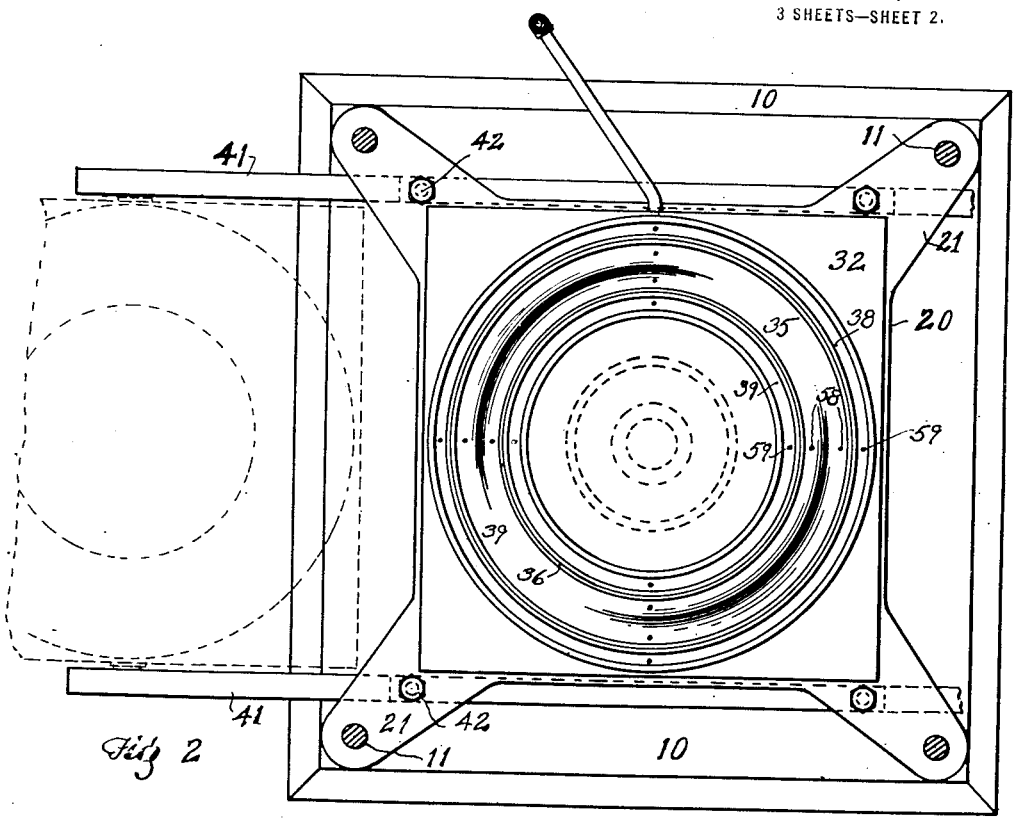
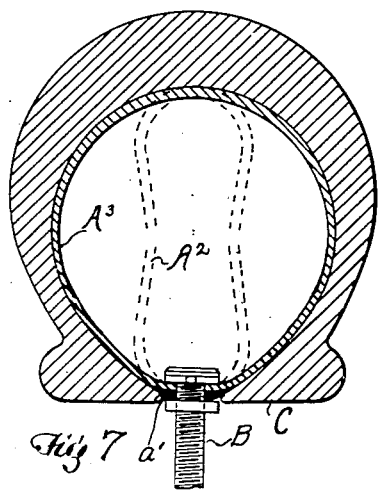
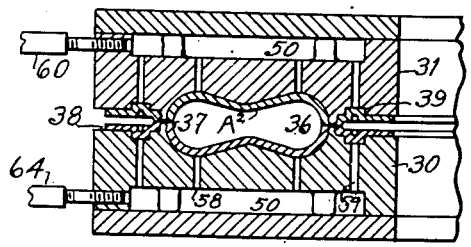
Inventor
Wm. E. Roberts,
By Bates & Mocklin,
Attys.

W. E. ROBERTS.
APPARATUS FOR MAKING HOLLOW RUBBER ARTICLES.
APPLICATION FILED DEC. 29, 1919.
1,387,617.
Patented Aug. 16, 1921.
3 SHEETS—SHEET 3.
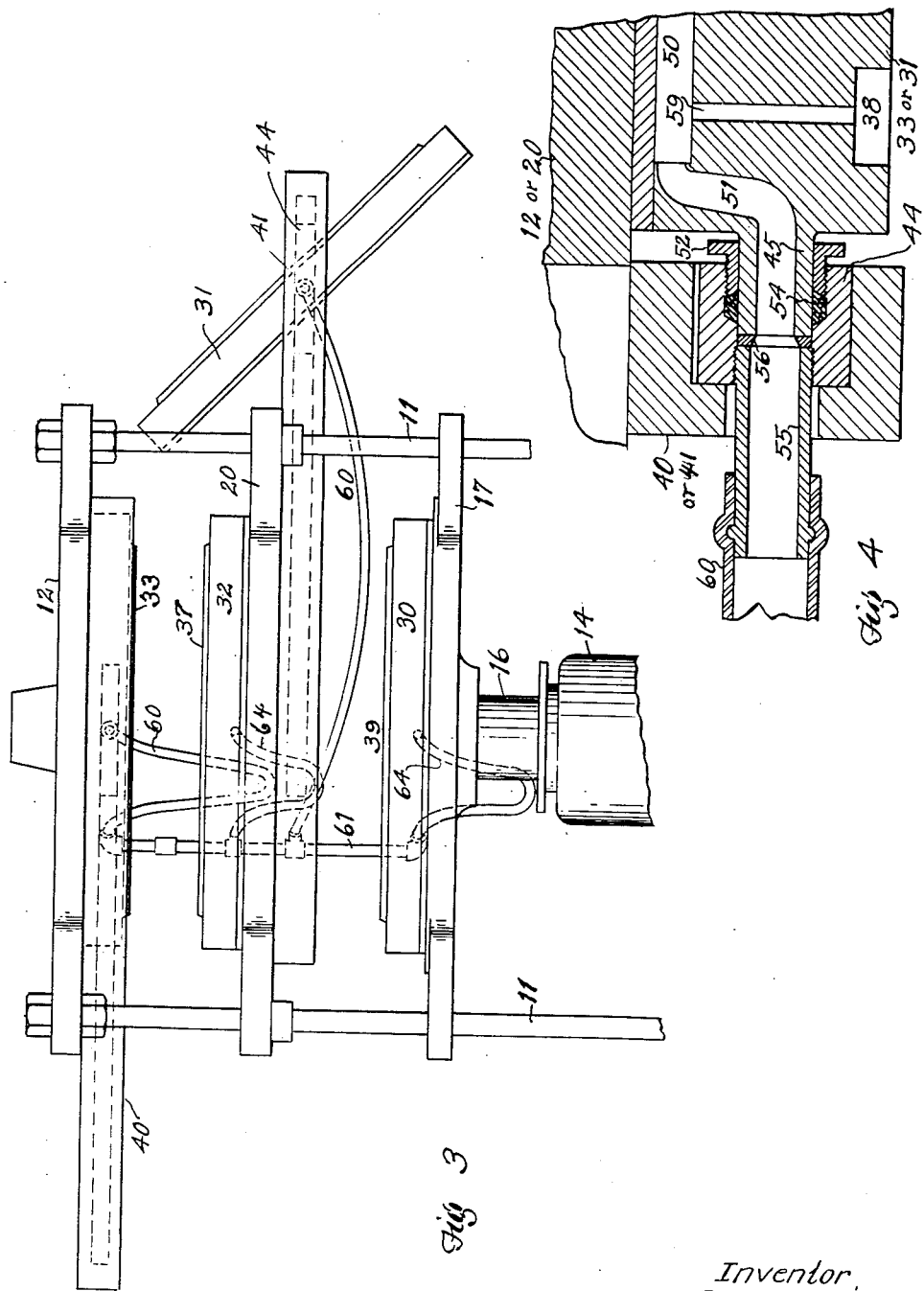
Inventor,
Wm. E. Roberts,
By Bates & Macklin,
Att'ys.

UNITED STATES PATENT OFFICE.

WILLIAM E. ROBERTS, OF ANDOVER, MASSACHUSETTS, ASSIGNOR TO PARAMOUNT RUBBER CONSOLIDATED, INC., OF PHILADELPHIA, PENNSYLVANIA, A CORPORATION OF DELAWARE.

APPARATUS FOR MAKING HOLLOW RUBBER ARTICLES.

1,387,617.      Specification of Letters Patent.      Patented Aug. 16, 1921.

Application filed December 29, 1919. Serial No. 348,093.

*To all whom it may concern:*

Be it known that I, WILLIAM E. ROBERTS, a citizen of the United States, residing at Andover, in the county of Essex and State of Massachusetts, have invented a certain new and useful Improvement in Apparatus for Making Hollow Rubber Articles, of which the following is a full, clear, and exact description, reference being had to the accompanying drawings.

This invention relates to an apparatus for the manufacture of hollow rubber articles involving employment of cavitary molds in which rubber stock may be pneumatically seated. The general object of the invention is to provide a mold press readily adapted for such purposes and enabling rapid and efficient operation. The invention comprises the means and combinations of mechanism employed in accomplishing the above object as hereinafter explained and as summarized in the claims.

Figure 1:
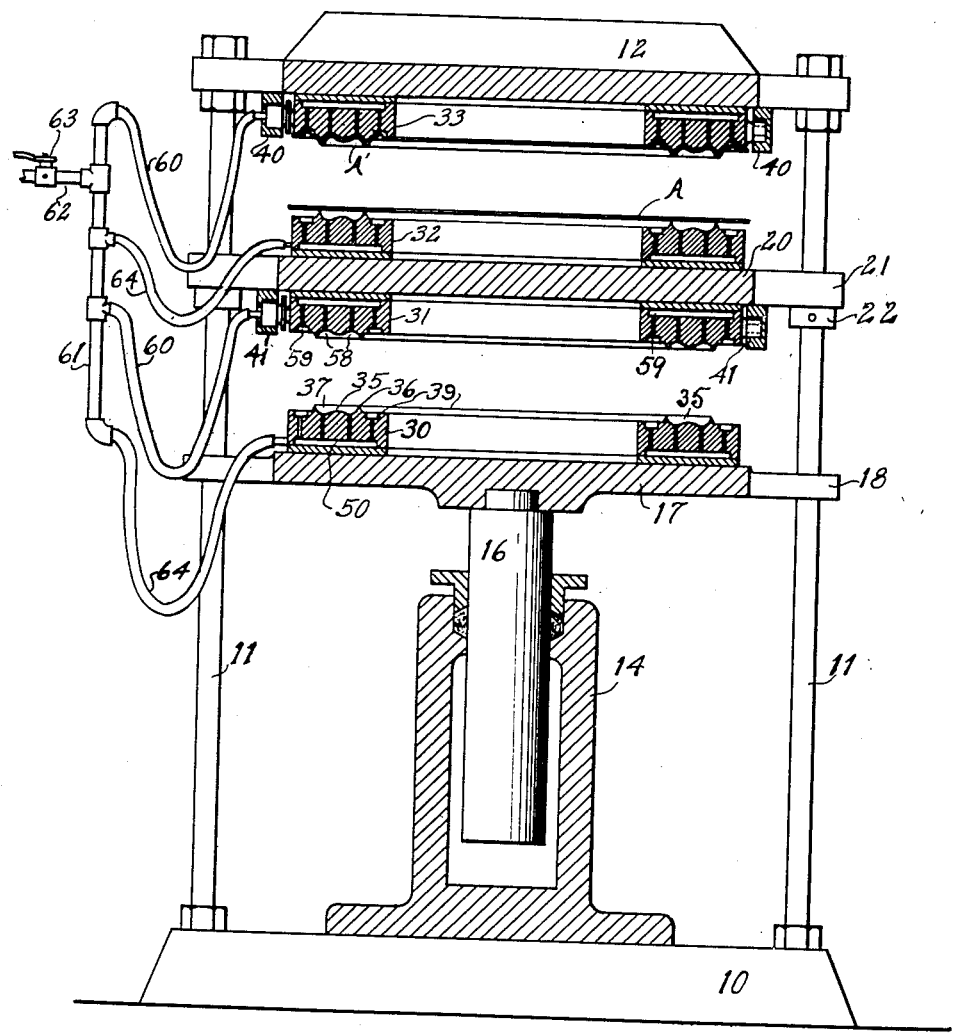
Figure 6:
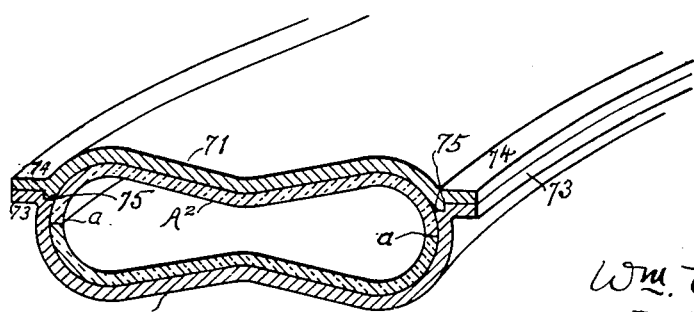

In the drawings, Figure 1 is a sectional elevation of my mold press. Fig. 2 is a sectional plan of the press, the section being taken just below the topmost mold. Fig. 3 is an elevation of the upper portion of the press at right angles to Fig. 1. These three views are on substantially the same scale. Fig. 4 is a detail of one of the hollow trunnion supports for the mold, being a vertical section axial of such trunnion. Fig. 5 is a fragmentary cross section of two of the forming molds of the press in conjunction, this view showing stock seated in the molds. Fig. 6 is a cross section of a vulcanizing mold showing a rubber tube seated therein. Fig. 7 is a cross section of the completed inner tube for a pneumatic tire, in place in a tire casing, the uninflated form of the tube being illustrated in broken lines.

As shown in Figs. 1, 2 and 3, the numeral 10 indicates the base of my mold press from which rise four standards 11, carrying at their top a head or stationary platen 12. Resting on the base is a hydraulic cylinder 14, within which is a vertical plunger 16. This plunger carries in its upper end a movable platen or head 17, having ears 18 embracing rods 11 and slidably guided thereby. The platen is adapted to be raised by hydraulic pressure to bring into co-action one or more pairs of molds between the platen and stationary head.

In the form shown, the press is of the multiple type, having a plurality of pairs of molds,—two pairs being illustrated. As shown, 20 indicates an intermediate movable platen between the plunger platen 17 and the head 12. This intermediate platen (of which there may be one or more than one, as may be desired) has ears 21 embracing the rods 11 and slidably guided thereby, while the lowermost position of this platen is limited by stationary collars 22 on the rods 11.

In Figs. 1 and 3, 30 indicates a mold resting on the movable head 17, and above this is a coöperating mold 31 supported on the underside of the intermediate platen 20. On the upperside of this platen rests a mold 32 and above this is a mold 33 supported on the underside of the head 12. The number of molds 31 and 32 would of course be increased correspondingly to the increase in the number of intermediate platens 20.

Each of the molds is adapted to have suction applied to its cavities as hereinafter explained to pneumatically seat rubber stock across the face of the mold. It is a simple matter to lay a sheet of such stock manually on top of lower molds as 30 or 32, such stock being illustrated by "A" in Fig. 1 on the mold 32. It is difficult however to properly place stock against the under face of the downwardly facing molds and hold it in position until such suction may seat it. To enable the sheet to be readily accurately positioned on these downwardly facing molds I provide a sliding pivotal support for them so that they may be withdrawn from beneath their supporting platens and inverted to cause their cavities to face upwardly or approximately so. Then after the rubber sheets are secured to them, they are returned to normal position for use.

For accomplishing the inversion above mentioned, I secure to the underside of the head 12, a pair of parallel bars 40, which have grooves on their inner sides, and I secure similar bars 41 to the underside of the intermediate platen or platens. These bars may be readily secured by bolts passing through the ears of the head or platens as shown at 42 in Fig. 2. Slidably mounted in the grooves of the stationary guide bars 40 and 41 are blocks 44 and journaled in these blocks are trunnions 45 extending from the mold, as 31 or 33. By this means the mold may be slid horizontally out from under the head or intermediate platen and may be then swung on its trunnions to invert it to bring its cavities into an upwardly facing position so that a rubber sheet may be laid over them, and then swung back with their cavities facing downwardly and returned to normal position.

The molds have their cavities communicating with suction chambers in the bases of the molds to which suction pipes or hose are connected. 64 indicates such hose for the upwardly facing molds, the hose having sufficient stock to allow the vertical movement of these molds. In the case of the trunnioned molds, the trunnion is made hollow and the suction pipe communicates with this trunnion. Thus as shown in Fig. 4, 50 indicates the vacuum chamber from which a passageway 51 leads outwardly through the hollow trunnion 45. A suitable packing nut 52 surrounds the trunnion and screws into the block 44 and by compressing packing 54 maintains an airtight connection. 55 indicates a pipe screwing in the block opposite the end of the trunnion and making an airtight connection with it by means of an interposed washer 56. 60 designates a suction hose secured to the pipe 55 and leading from thence to a stationary pipe 61 which is connected by a pipe 62 under the control of a valve 63 with the source of exhaustion. The hose pipes 64 also communicate with this pipe 61.

The cavities of the molds will of course vary according to the article to be produced. As shown in the drawings, they are annular cavities for making inner tubes for automobile tires. Thus each mold has a main annular cavity 35 in its face embraced on its interior and exterior by raised annular ribs 36 and 37. Beyond these ribs are annular grooves 38 and 39, to enable suction to act on the marginal portions of the rubber sheets. The main cavities 35 are connected with the suction chamber 50 in the base of the mold by small passageways 58, and similarly the clamping grooves 38 and 39 are connected to the vacuum chamber by small openings 59.

In the operation of the machine sheets of rubber are laid on the upwardly facing molds as 30 and 32; then the downwardly facing molds are drawn out from under their respective platens and are inverted; then sheets of rubber are laid on these inverted molds. These operations in the duplex press shown, can be most readily effected by two attendants one on each side of the machine. Now the valve 63 is opened and suction is thus applied simultaneously to all of the molds. At the same time the edge portions of the sheets are pressed manually against the vacuum grooves, with the result that the suction draws the sheet into those grooves, thus holding the sheet and shutting off outside air to the cavities and the suction then draws the intermediate portion of the sheet into the main cavity, as shown at "$A^1$" in Fig. 1 in the case of the mold 33. Now the invertible molds are returned to position beneath the respective heads and then the plunger is operated by the admission of hydraulic pressure to the cylinder, raising the movable platens and bringing the molds into conjunction.

When brought together the different pairs of molds have the relative position illustrated in Fig. 5, where the two portions of seated stock are pinched together by the cutting edges 36 and 37 and are thus joined by a seam, the excess of rubber being sheared off beyond the seam. Before bringing the molds together ammonia powder or some other expanding substance may be placed in the upwardly facing seated stock to provide the desired internal expansion when the article is vulcanized.

After formation of the article, the hydraulic pressure is relieved, the mold members separated, and the articles removed and placed in vulcanizing molds and vulcanized. A preferred form of such vulcanizing mold for tire-tubes is illustrated in Fig. 6, and is shown as consisting of two annular trough-like members 70 and 71, having a combined internal cavity corresponding to the exterior of the formed article, and having flanges 73 and 74, which may be clamped together to hold the mold as a rigid unit. In order that the slight fin or rib at the seam of the article, when it is formed, may be absorbed in the vulcanization, I arranged the meeting edges of the two mold members 70 and 71 so that they will be necessarily out of registration with the seam. Thus, as shown in Fig. 6, the hollow tube "$A^2$" has its meeting edges at "$a$" while the meeting edges of the mold members are at 75.

After vulcanization the nipple may be secured to the tube in any desired manner. Fig. 7 shows in full lines the tube inflated as at "$A^3$" and in dotted lines the approximate form of the tube when uninflated as at "$A^2$." The valve nipple is designated "B" in this view; it passes through the tube and a patch "$a^1$" shown on the outer side thereof and is held by the usual head and nut on the nipple, "C" in this figure indicates any tire casing in which the tube may be used.

By making the tube of the form shown, that is, in cross section an elongated loop with a contracted waist, it is somewhat stretched at the sides when inflated in the tire casing, thus making it relatively thinner at the sides and correspondingly thicker at the tread, as shown in Fig. 7. This is a desirable result as it places the rubber where it is most effective, and is therefore shown, but it should be observed that the present invention is independent of the form of the article produced.

It will be noted from Fig. 4 that there is a clearance above the guide blocks and mold trunnions. This enables the thrust toward the base of the mold, when under hydraulic pressure, to be taken directly by the platen without straining the trunnion connection. When the hydraulic pressure is released the mold is sufficiently freed from engagement with the platen surface so that it may be readily slid out and in, as desired.

I claim:

1. In an apparatus of the class described, the combination of a press, a mold adapted to be operated thereby, and means for so supporting the mold that it may be inverted when desired.

2. The combination of a press, a mold adapted to be carried thereby with its active face downward, and means for so supporting the mold that it may be inverted without disconnection from the press.

3. The combination of a press, a mold adapted to be carried thereby with its active face downward, and means for so supporting the mold that it may be withdrawn laterally from active position and inverted.

4. The combination of a press having a pair of platens, at least one of which is movable, a pair of coacting mold members carried by the respective platens, one of such mold members facing upwardly and the other downwardly, and suitable supporting means for the downwardly facing mold enabling it to be withdrawn from beneath its platen and inverted to cause it to face upwardly.

5. The combination of a press having a pair of platens, at least one of which is movable, a pair of mold members, one resting on the upper side of one of the platens and the other pivotally and slidably supported on the under side of the other platen.

6. The combination of a press having a pair of platens, at least one of which is movable, a pair of mold members, one resting on the upper side of one of the platens and the other supported on the under side of the other platen, the latter support comprising a pair of projecting guides to which the corresponding mold member is pivotally and slidably connected.

7. The combination of a press having platens, at least one of which is movable, a pair of coacting mold members, one carried on the upper side of one platen and facing upwardly and the other carried on the under side of the adjacent platen and facing downwardly, a guide bar carried by the latter platen, and a member slidably mounted on the guide bar, said mold being pivoted to said member.

8. The combination of a press having a pair of platens, a pair of coacting mold members, one of which faces upwardly and rests on the upper side of one of the platens, the other of which faces downwardly and is carried on the under side of the other platen, carrying means for the latter mold comprising a pair of projecting bars, blocks sliding along the bars, and trunnions on the molds pivotally mounted in the blocks.

9. The combination of a press having a pair of platens, a pair of coacting mold members, one of which faces upwardly and rests on the upper side of one of the platens, the other of which faces downwardly and is carried on the under side of the other platen, carrying means for the latter mold comprising a pair of longitudinally recessed bars, blocks sliding in the recesses, and trunnions on the molds pivotally mounted in the blocks.

10. The combination of a multiple mold press, pairs of molds carried thereby, each pair including one member facing upwardly and another facing downwardly, and means pivotally and slidably connecting the molds which are on the under sides of their platens with said platens in such manner that the alternate molds may be withdrawn in opposite directions.

11. The combination of a multiple mold press, pairs of molds carried thereby, each pair including one member facing upwardly and another facing downwardly, guides carried on the under sides of platens of the press and extending alternately in opposite directions for successive platens, and means pivotally connecting the molds which are on the under sides of their platens with said guides, there being provision for movement of the latter molds to and from the press.

12. The combination with a mold press, of a cavitary mold adapted to be carried by the press, means for exhausting air from said mold, and means for enabling the molds to be inverted while such exhaustion is maintained.

13. The combination with a mold press, of a pair of coacting cavitary molds adapted to be carried by the press, means for exhausting air from said molds, and means for enabling one of the molds to be inverted while such exhaustion is maintained.

14. The combination of a mold press, a pair of coacting molds adapted to be carried thereby, means for applying suction to each mold of the pair, and means for so supporting one of the molds that it may be withdrawn from the press and thereafter inverted while the suction thereon is maintained.

15. The combination of a mold press, a mold adapted to be carried thereby, said molds being pivotally supported, and means for exhausting the air from said mold through its pivot.

16. The combination of a mold press, a pair of coacting molds adapted to be carried thereby, one of said molds being pivotally supported, and means for exhausting the air from the latter mold through its pivot.

17. The combination of a press, a guide carried thereby, a mold movable toward and from the press and pivotally connected with the guide, and means operating through the pivot of the mold for exhausting air therefrom.

18. The combination of a mold press, a pair of coacting cavitary molds carried thereby, means for applying suction to said molds, one of the molds facing upwardly and the other facing downwardly, the latter mold being slidably and pivotally supported by the press.

19. The combination of a mold press, a pair of coacting cavitary molds carried thereby, means for applying suction to said molds, one of the molds facing upwardly and the other facing downwardly, the latter mold being slidably and pivotally supported by the press, and its exhaustion taking place through its pivot and irrespective of its position.

20. The combination with a mold press, of molds carried thereby, one of said molds being so supported that it may be withdrawn and inverted, and means for applying suction to said mold when withdrawn and maintaining such suction until after the mold is restored to normal position.

21. The combination of a mold press having a pair of coacting molds facing respectively upwardly and downwardly, means for exhausting air from both molds, and means for so supporting the downwardly facing mold that it may be withdrawn from the press and inverted.

22. The combination of a press having a stationary and a movable platen, coacting molds carried by the platens and facing respectively downwardly and upwardly, means for applying suction to said molds, means for pivotally and slidably supporting the downwardly facing mold, enabling it to be withdrawn from the press and inverted and then turned back and restored, such movement not interfering with the suction connection of the mold.

23. The combination of a mold press having a pair of coacting molds, means for so supporting one of the molds that it may be withdrawn from the press and inverted.

24. The combination of a mold press having a pair of coacting molds, means for moving one of the molds vertically, and means for so supporting one of the molds that it may swing on a horizontal axis.

25. The combination of a mold press having a pair of coacting molds facing respectively upwardly and downwardly, means for so supporting the downwardly facing mold that it may be withdrawn from the press and inverted, and means including a flexible hose for applying suction to the latter mold when inverted and maintaining such suction while the mold is restored to normal position.

26. The combination of a mold press having a pair of platens, at least one of which is movable, a mold having trunnions movably mounted, and a flexible connection leading to said mold.

27. The combination of a mold press having a pair of platens, at least one of which is movable, guides carried by one of the platens, a mold movable toward and from the press and having trunnions mounted to swing on said guides, and a flexible connection leading to said mold.

28. The combination of a mold press having a pair of platens, at least one of which is movable, a pair of guide bars carried by one of the platens, blocks slidably mounted in the guide bars, a mold having trunnions journaled in said blocks, one of said trunnions being hollow and communicating with the interior of the mold, and a flexible connection leading to said hollow trunnion.

In testimony whereof I hereunto affix my signature.

WILLIAM E. ROBERTS.